Nov. 6, 1951     W. B. WOODY ET AL     2,574,204
CAM OPERATED CLUTCH

Filed Dec. 20, 1945     2 SHEETS—SHEET 1

INVENTORS
W. B. Woody
S. E. Corry
BY
R. L. Werlin
ATTORNEY

Patented Nov. 6, 1951

2,574,204

UNITED STATES PATENT OFFICE 2,574,204

CAM OPERATED CLUTCH

Wayland B. Woody and Stuart E. Corry, Tulsa, Okla., assignors to Franks Manufacturing Corporation, Tulsa, Okla., a corporation of Oklahoma Application December 20, 1945, Serial No. 636,118

3 Claims. (Cl. 192—93)

This invention relates to clutches and particularly to clutch shifting mechanisms.

A principal object of this invention is to provide a clutch shifting mechanism of relatively simple design having a minimum number of working parts.

Further objects are to provide a clutch shifting mechanism which is positive in its action and smoothly functioning; in which the shifting load is so distributed as to give a variation in the pressure on the shifting lever which closely reflects the clutch pressure; in which friction is substantially reduced; and in which the extent of the shifting movements required by the operator are greatly reduced.

Other and more specific objects and advantages of this invention will become apparent from the following detailed description when read in conjunction with the accompanying drawings which illustrate one embodiment of this invention.

In the drawings:

Fig. 3 is a side elevation of the clutch shifting cam in accordance with this invention; and Fig. 4 is an end view of the cam shown in Fig. 3.

Figure 1:
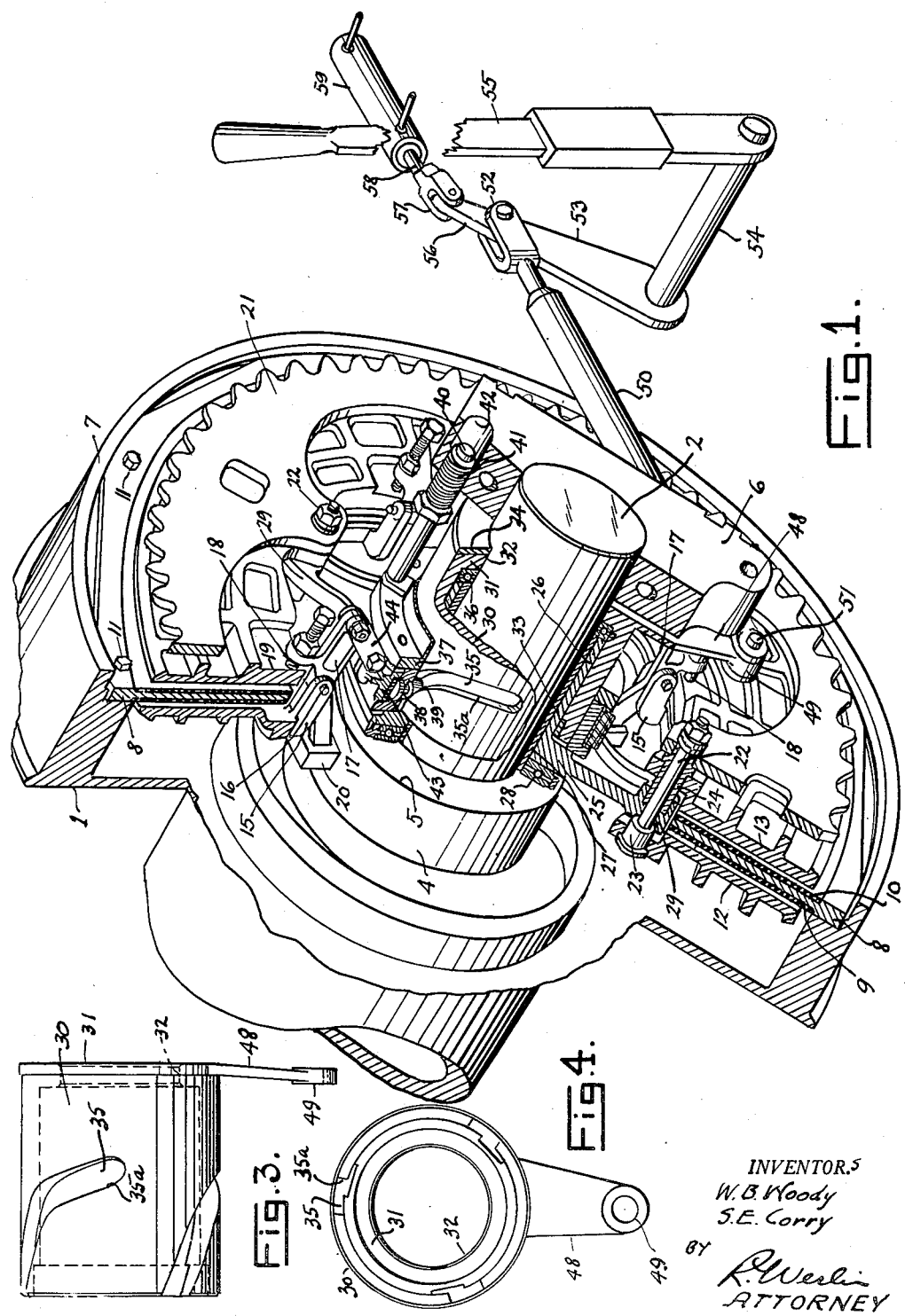
Fig. 1 is a perspective view, partly in section, showing a clutch assembly including the shifting mechanism of this invention.
Figure 2:
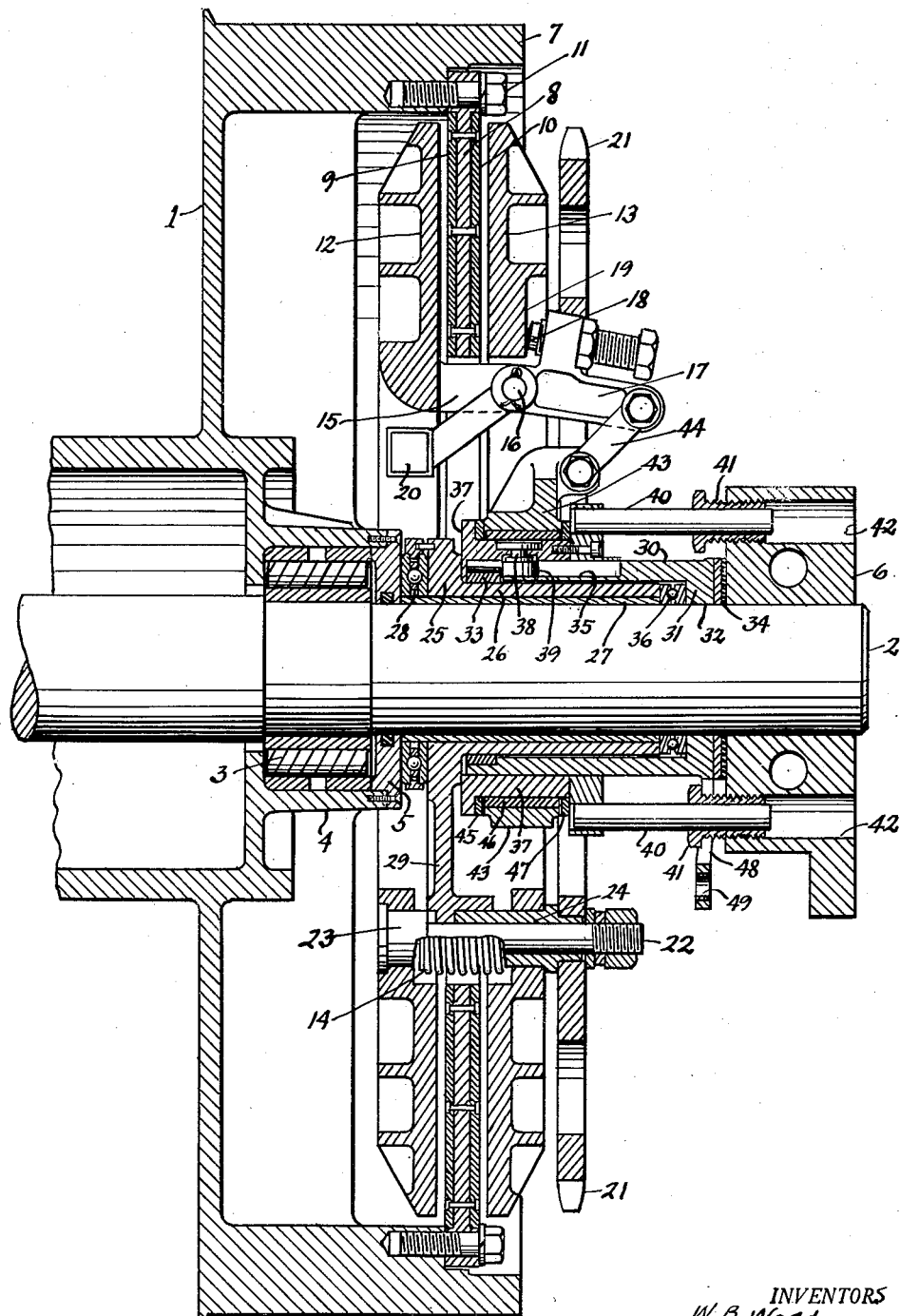
Fig. 2 is a center sectional view of the clutch assembly.

Referring to the drawings, a clutch drum 1 is mounted on a stationary shaft 2 and is rotatable thereon through the medium of roller bearings 3, mounted in the hub 4 of the drum. The outer end of hub 4 is closed by a circular cap 5, through which shaft 2 extends. The outboard end of shaft 2 is supported by a pillow block 6. Drum 1 is adapted to be connected to a machine element (not shown), to be driven thereby, and is provided with an annular horizontally extending edge flange 7. Extending parallel to drum 1 is an annular friction plate 8 faced on both sides with friction surfaces 9 and 10. Friction plate 8 is rigidly connected to annular flange 7 by means of bolts 11. Disposed on opposite sides of friction plate 8 are ring shaped inside and outside driving plates 12 and 13, respectively, which are adapted to move toward each other to engage friction surfaces 9 and 10 and to move in the opposite direction for disengaging the clutch members. Driving plates 12 and 13 are rotatable relative to shaft 2, as will be hereinafter described, and are normally held apart and away from friction surfaces 9 and 10 by means of a plurality of coil springs 14 which are arranged concentrically about the axis of the clutch. The inside driving plate 12 is provided with a plurality of arms 15, equally spaced about its inner periphery, which extend forwardly through the group of clutch plates to a point adjacent the front face of outside driving plate 13. Each of the arms 15 is pivotally connected at 16 to the intermediate portion of a lever 17, which has mounted thereon a clutch dog 18 adapted to bear on suitable bearing surfaces 19 circularly disposed on the outer face of outside driving plate 13. The portions of levers 17 extending inwardly from pivot pin 16 are provided with counterbalances 20 on the inner ends thereof. With this arrangement, when clutch dogs 18 are brought to bear on bearing surfaces 19 to force driving plate 13 into engagement with friction surface 10, this movement will simultaneously draw inside driving plate 12 into engagement with the opposite friction surface 9 through leverage exerted through arms 15 about pivot pins 16 as the fulcrums. A toothed sprocket 21, adapted to be driven by the usual chain (not shown), is connected to the driving plates 12 and 13 by means of drive bolts 22 which extend through these members. Sleeves 23 and 24 are interposed between the drive bolts and driving plates 12 and 13, respectively, to permit sliding movement of these plates relative to each other on drive bolts 22. A clutch drive ring 25 having a tubular hub 26 is mounted on shaft 2 on a sleeve bearing 27 which provides a bearing surface for rotational movement of the drive ring on the shaft. A thrust bearing 28 is mounted on the inner end of sleeve bearing 27 between the outer face of hub cap 5 and the inner face of drive ring 25. A plurality of arms 29 extend radially from ring 25 between driving plates 12 and 13, and drive bolts 22, connecting the driving plates, extend through the ends of arms 29. Mounted on hub 26 of drive ring 25 is a cylindrical cam 30 which has one end open and the other end closed by means of a cap 31 which has a bore 32 through which shaft 2 extends, bore 32 being adapted to slidingly engage the surface of shaft 2. A sleeve bearing 33 is provided between the inner surface of cam 30 and the adjacent surface of hub 26 and an annular bearing 34 is provided between the outer end of cap 31 of the cam and the adjacent face of pillow block 6. Curved cam slots 35, spaced at 120° intervals, are cut into the outer surface of cam 30 and extend rearwardly along the surface of the cam from the inner edge thereof, as shown particularly in Figs. 3 and 4. These cam slots are provided with curved working faces 35a. Roller bearings 36 are arranged on shaft 2 between the outer ends of hub 26 and bearing 27 and opposed face of cap 31 of the cam. An annular follower hub 37 is mounted on cam 30 adjacent the inner end thereof, and abutting against the inner face of drive ring 25. Follower hub 37 carries depending follower pins 38 supporting tubular bearings 39 which are engaged in cam slots 35 and adapted to roll on working faces 35a. A pair of guide pins 40 are connected to the rear of follower hub 37 at diametrically spaced points thereon and extend horizontally therefrom through sleeves 41 which are threadedly inserted in openings 42 in pillow block 6. Rotatably mounted on the outer surface of follower hub 37 is a shifter ring 43 which is connected by a plurality of links 44 to the outer ends of levers 17, which support the clutch dogs 18. Bearings 45, 46, and 47 are interposed between adjacent surfaces of follower hub 37 and shifting ring 43. Extending radially from cap 31 of the cam and rigidly connected thereto is an arm 48 provided with a journal 49 at its outer end. An operating link 50 is connected to the end of arm 48 by means of a bolt 51 extending through the end of link 50 and journal 49 in the arm. The opposite end of link 50 is connected by a clevis 52 pivotally connected to one end of an arm 53, the outer end of which is mounted on a shaft 54, to which is connected a hand lever 55. Arm 53 is also provided with an extension 56 which is connected at 57 to the end of a piston rod 58 mounted in a fluid pressure operated cylinder 59 of conventional form, in which piston rod 58 is reciprocable in response to the application of fluid pressure within the cylinder in the well known manner.

The apparatus above described operates in the following manner:

Referring to Fig. 1 in which the parts of the clutch and the shifting mechanism are shown in the disengaged position, engagement of the clutch is effected by moving operating handle 55 to the left. This movement, acting through shaft 54, arm 53 and link 50, forces arm 48, which is attached to cam 30, to the left. This produces clockwise rotation of cam 30 on shaft 2. As the cam turns in the clockwise direction shifter hub 37 is drawn rearwardly over the surface of cam 30 through the engagement of working faces 35a of cam slots 30 with the follower pin rollers 39. The torque in shifter hub 37 produced by this operation is resisted through the engagement of guide pins 40 in pillow block 6. Consequently, shifter hub 37 is forced to engage in the rearward movement described. As this movement occurs, shifter ring 43, being mounted on follower hub 37 moves rearwardly with the follower hub and this movement acting through pivoted links 44 on levers 17 produces the usual clutching action of driving plates 12 and 13 upon stationary clutch plate 8 through frictional engagement with the friction surfaces 9 and 10. With the clutch thus engaged, when power is applied to sprocket 21 from a suitable source (not shown), drum 1 will rotate on shaft 2, as will shifter ring 43, and power will therefore be transmitted through sprocket 21 to drum 1. To disengage the clutch, the described operations are reversed, in which case, cam 30 will be rotated counter-clockwise, producing a forward movement of follower hub 37, which acting through a corresponding movement of shifter ring 43 will disengage the clutch members. The extent of rearward movement of follower hub 37 may be adjusted by adjustment of the threaded sleeves 41 in openings 42 in pillow block 6.

Engagement and disengagement of the clutch by means of the mechanism herein described may be affected, of course, while the movable members of the clutch and the driving sprocket 21 and drive ring 25 are rotating, because of the rotative connection between shifter ring 43 and follower hub 37, cam 30 remaining stationary on shaft 2 except for the limited extent of rotational movement produced in effecting engagement and disengagement of the clutch as described.

The working faces 35a of cam slots 35 may be machined to any desired contour, depending upon the characteristics desired in the shifting operations. The curvature of the working faces may be more or less regular throughout their length, in which case the pressure applied will be relatively uniform throughout the shifting operation. Normally, however, the degree of curvatures of the working faces will be varied at a constantly increasing rate, as in the case of a helix, and will be more or less sharply altered at some point thereon, such as to produce a substantial change in pressure immediately before the clutch becomes fully engaged, so that the pressure differential will be reflected through the shifting linkage to the operator and, in effect, signal to him the engagement of the clutch. This point will normally correspond to the "dead center" position beyond which the change in curvature will be such as to hold the clutch locked in engagement. In the reverse movement, the clutch will remain engaged through a short movement of the shifter hub until the follower pin bearings pass this "dead center" position when the clutch again becomes disengaged.

In the illustrative embodiment above described, three cam slots, spaced 120° apart, are shown. It will be understood that any other suitable or desirable number of slots may be employed. Although a single slot may be employed, it is generally desirable to use more than one for purposes, primarily, of better balance and distribution of the pressure load in the shifting operation. Where two or more slots are employed it is essential that the working faces be parallel throughout their lengths about the surface of the cam and that their projected center lines be likewise parallel.

Instead of manual shifting of the clutch by means of the hand lever 55, fluid pressure operated means may be employed for this purpose. In this embodiment pressure fluid, such as air or hydraulic fluid, is admitted in the conventional manner to cylinder 59 for purposes of reciprocating piston rod 58, if desired to move arm 53 and its connecting linkage to cam 30.

With the arrangement above described, many of the moving parts normally employed in clutch shifting mechanisms are eliminated, more positive and delicate control of the shifting operation may be attained, and the clutch and the shifting mechanism may be made more compact and generally simpler, thereby reducing initial costs as well as repair and maintenance costs. A further advantage is that, by the arrangement described, the end of stationary shaft 2 will be relatively unobstructed by any clutch shifting mechanism and may, therefore, be extended to any desired length outside pillowblock 6 so that it may be used for mounting other power mechanisms in compact relationship to the clutch and to the mechanism being controlled by the clutch herein described.

It will be understood that various alterations and changes may be made in the details of the device herein disclosed within the scope of the appended claims but without departing from the spirit of this invention.

What we claim and desire to secure by Letters Patent is:

1. In combination with a clutch rotatably mounted on a stationary shaft, a clutch shifting mechanism, comprising, a cylinder rotatable on said shaft, a clutch shifting member rotatable about said cylinder and having pivoted connection to said clutch for effecting engagement and disengagement of said clutch in response to movements of said clutch shifting member longitudinally of said cylinder, cam means carried by said cylinder and engageable with said clutch shifting member to produce said longitudinal movements of the latter in response to rotation of said cylinder, means for rotating said cylinder, and means connected to said clutch shifting member and arranged to oppose the rotational torque developed therein by said rotation of said cylinder.

2. In combination with a clutch rotatably mounted on a stationary shaft, a clutch shifting mechanism, comprising, a cylinder rotatable on said shaft, a clutch shifting member rotatable about said cylinder and having pivoted connection to said clutch for effecting engagement and disengagement thereof in response to movements of said clutch shifting member longitudinally of said cylinder, cam means carried by said cylinder and engageable with said clutch shifting member to produce said longitudinal movements of the latter in response to rotation of said cylinder, and fluid pressure actuated means for rotating said cylinder.

3. In combination with a clutch rotatably mounted on a stationary shaft, a clutch shifting mechanism comprising, a cylinder rotatable on said shaft, a plurality of curved parallel cam slots in said cylinder extending generally rearwardly thereof, a clutch shifting ring slidably mounted on said cylinder, cam follower members carried by said ring and operatively engaged in said cam slots, torque resisting means connected to said ring to limit the movements thereof relative to said cylinder when the latter is rotated to longitudinal movements, a collar member rotatively mounted on said shifting ring and having pivoted connection to said clutch for effecting engagement and disengagement thereof in response to said longitudinal movements, and means for rotating said cylinder to produce said longitudinal movements.

WAYLAND B. WOODY.
STUART E. CORRY.

REFERENCES CITED

The following references are of record in the file of this patent:

UNITED STATES PATENTS

| Number | Name | Date |
|---|---|---|
| 468,682 | McLaughlin | Feb. 9, 1892 |
| 576,474 | Sampson | Feb. 2, 1897 |
| 587,208 | Hunt | July 27, 1897 |
| 1,008,309 | Cushman | Nov. 14, 1911 |
| 1,041,010 | Brownell | Oct. 15, 1912 |
| 1,131,401 | MacPherson | Mar. 9, 1915 |
| 1,521,706 | Olsen | Jan. 6, 1925 |
| 1,625,769 | Ersted | Apr. 19, 1927 |
| 2,008,967 | Rossmann | July 23, 1935 |
| 2,342,880 | Masek | Feb. 29, 1944 |